United States Patent [19]
Howard

[11] 3,902,266
[45] Sept. 2, 1975

[54] NOVELTY FISHING LURE

[76] Inventor: William E. Howard, 850 Stadelman Ave., Akron, Ohio 44320

[22] Filed: May 8, 1974

[21] Appl. No.: 468,093

[52] U.S. Cl. ............... 43/42.13; 43/42.26; 43/42.32
[51] Int. Cl. .............................................. A01k 85/00
[58] Field of Search............. 43/42.14, 42.13, 42.26, 43/42.27, 42.31, 42.32, 42, 42.45; 46/92

[56] References Cited
UNITED STATES PATENTS

| | | | |
|---|---|---|---|
| 865,683 | 9/1907 | Credlebaugh | 43/42.32 |
| 2,437,549 | 3/1948 | Pecher | 43/42.26 |
| 2,485,053 | 10/1949 | Layfield | 43/42.13 |
| 2,691,235 | 10/1954 | Pcola | 43/26.2 |
| 2,922,244 | 1/1960 | Benner, Sr. | 43/26.2 |
| 3,007,276 | 11/1961 | Lidert | 43/26.2 |
| 3,464,154 | 9/1969 | Di Leva | 46/92 |

*Primary Examiner*—Warner H. Camp

[57] ABSTRACT

A novelty fishing lure which can be made in a form so to resemble people, animals, cartoon characters and other objects, the lures including moveable appendages and supporting hooks for being baited. In one embodiment, the lure is provided with resilient arms having pockets formed therein to cause rotation of the same in water. The arms are adapted to flex resilient fin members when rotated.

3 Claims, 5 Drawing Figures

PATENTED SEP 2 1975　　　　　　　　　　　　　　　　3,902,266
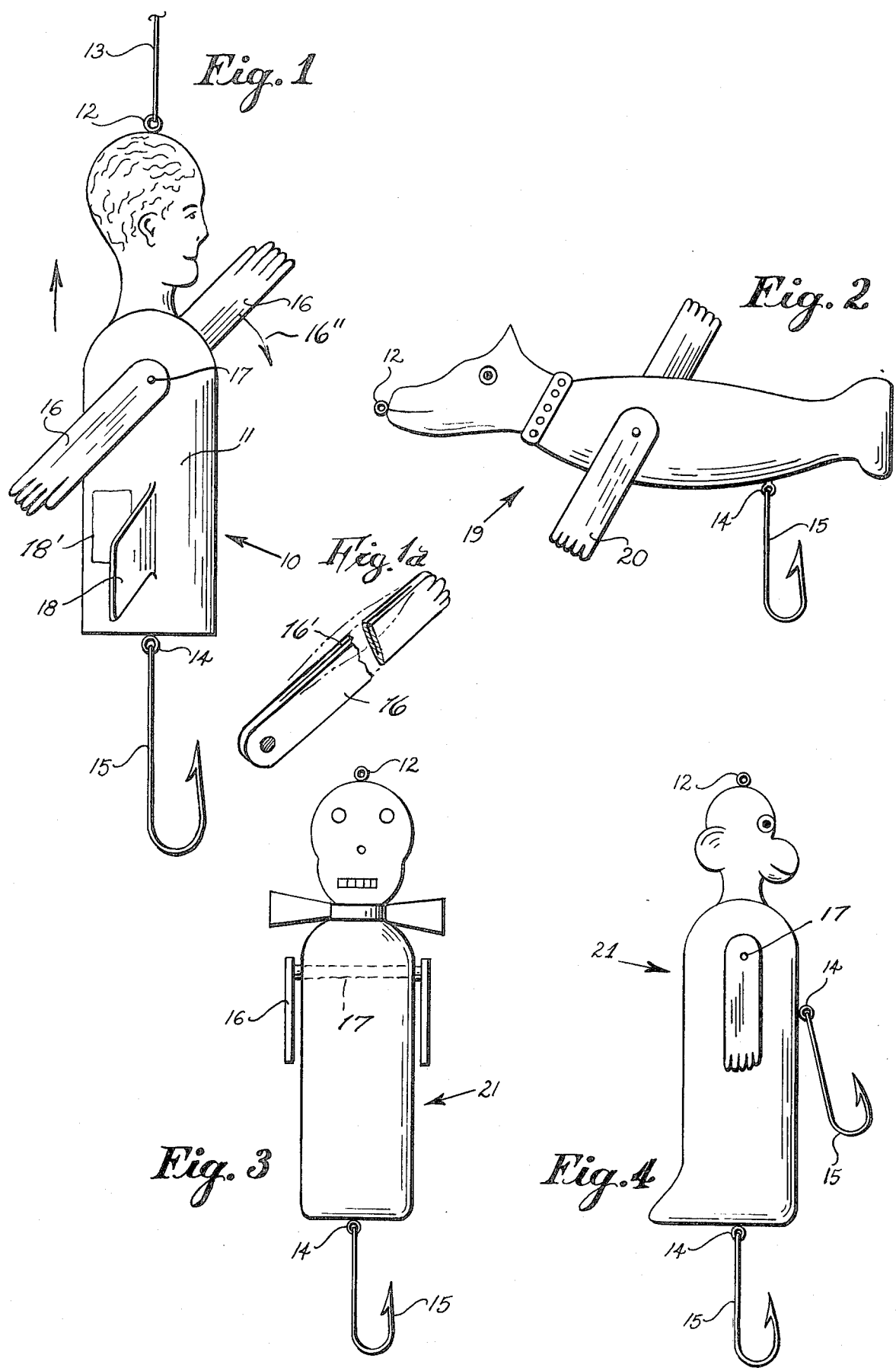

NOVELTY FISHING LURE

This invention relates generally to fishing lures.

A principal object of the present invention is to provide a novel fishing lure in which the lure body is a representation of a person, an animal, a cartoon character or any other desirable object.

Another object of the present invention is to provide a novelty fishing lure which can produce changeable colors so as to attract fish.

Still another object of the present invention is to provide a novelty fishing lure that incorporates rotatable appendages that represent arms or fins, and which serve to attract fish as the lure is moved through water.

Other objects of the present invention are to provide a novelty fishing lure which is simple in design, inexpensive to manufacture, rugged in construction, easy to use and efficient in operation.

These and other objects will be readily evident upon a study of the following specification and the accompanying drawing, wherein:

FIG. 1 is a side elevation view of a novelty fishing lure which is in a shape to represent a man;

FIG. 1A is a perspective view of one of the appendages of the lure illustrated in FIG. 1 and shown incorporating a means for causing rotation thereof in the water;

FIG. 2 is a side elevation view of the present invention shown in a design having a dog head;

FIG. 3 is a front elevation view of still another modified design of animal representation which is that of a comical monkey character;

FIG. 4 is a side elevation view thereof.

Referring now to the drawing in detail, and more particularly to FIGS. 1 and 1a thereof at this time, the reference numeral 10 represents a novelty fishing lure according to the present invention wherein there is a lure body 11 which is in the shape of a man by incorporating a head configuration at one end thereof. An eye screw 12 secured to the head representation of the lure body serves for securement of a fishing line 13 thereto. Another eye screw 14 secured to an opposite end of the lure body 11 is adaptable for securement of a fish hook 15 thereto.

In the present invention, moveable appendages are incorporated into the structure for the purpose of attracting fish. In this form of the invention, such moveable appendages comprise arms 16 on opposite sides of the body 11, the arms 16 being pivotable about pin 17 extending transversely through the body 11.

As shown in FIG. 1a rotational movement to the arms 16 may be provided by a pocket 16 prime being formed along one longitudinal edge of each arm, each of the arms being made of a resilient material such as rubber or the like so that the pocket opens up when the pocket opening faces a direction into which the lure is being pulled, the pocket thus opening up serving as a brake so as to cause the arm to pivot in the direction as shown by arrow 16 double prime. It is understood that in this construction both of the arms 16 are fixedly secured to the pin 17 so that movement of one of the arms causes the other arm to pivot as well. When the pocket opening faces a rearward direction, the pocket is closed, thus the arm is narrower so to offer less resistance to the water in order to move forwardly into the direction into which the lure is being pulled. Thus complete rotational movement of the arms are provided as the lure is pulled through the water, and fish are attracted to this motion.

As also shown in FIG. 1, the body 11 incorporates a fin 18 on each opposite side of the body, each of the fins being made of any resilient material such as rubber which will flex when the passing arms 16 strike against the same. The fins may be attractively colored. A painted surface 18 prime upon the body 11 is located near the fin 18, the area 18 prime being of a specific color so that when the colored fin 18 is flexed due to the arm movement, the color of the fin is reflected in the colored area 18 prime, so to give the appearance of the area 18 prime changing color. For example if the fin 18 is painted blue, and the area 18 prime is painted yellow, when the fin 18 is flexed so that it reflects in the area 18 prime, the reflection of the blue color from the yellow color causes the area 18 prime to appear momentarially green. Thus changing colors attract fish.

In FIG. 2, the fishing lure incorporates a body 11 having a head configuration at one end thereof in the shape of a dog head. This fishing lure 19 incorporates rotatable legs 20 about pin 17 as above described. It also includes the above described eye screws 12 and 14 as well as fish hook 15.

In FIGS. 3 and 4, another modified design of novelty fishing lure is shown. The lure incorporates a body and head configuration at one end thereof for a comical monkey character 21. This lure likewise includes the above described eye screws 12 and 14, fish hook 15 and arms 16. However in this form of the invention, the arms are affixed to the pin with both arms extending in a same direction instead of in an opposite direction such as shown in FIG. 1.

Thus different forms of the invention have been provided. It is to be understood that numerous other ornamental designs of lure bodies may be utilized and which may represent inanimate objects such as ships, submarines and the like. The fishing lure may incorporate advertising material upon its surface and may be used in political campaigns. The lure may be made to incorporate pictures as well as signatures, if so desired.

While various changes may be made in the detail construction, it is understood that such changes will be within the Spirit and scope of the present invention as is defined by the appended claims.

What I now claim is:

1. In a novelty fishing lure, the combination of a body, said body being in a shape representing a man, animal or other object, one end of said lure having an eye screw for securement to a fishing line, an opposite end of said body having an eye screw for securement to a fishing hook, and means incorporated by said body for attracting fish, said means comprising a pair of appendages upon opposite sides of said body, said appendages representing arms, said arms being secured fixedly to opposite ends of a pin extending transversely through said body, said arms extending in opposite radial directions for rotating around said pin, said arms each being made of a resilient material and having a pocket along one longitudinal side edge thereof whereby said resilient arms cause said pockets to open up when said pockets face a direction into which said lure is being pulled, said pockets thus opening up and serving as a brake to cause said arms to pivot.

2. The combination as set forth in claim 1, wherein a sideward projecting fin is provided upon opposite sides of said body, said fin being made of resilient rubber material in order to flex, said fin being in the path of said rotating arms, whereby said fins are flexed thereby.

3. The combination as set forth in claim 2, wherein an area is provided on said body which is near said fins, said area being of one color, said fin being of another color, whereby when flexed, the color of said fin reflects in the color of said area so to momentary change the color of said area to a resultant secondary color.

* * * * *